(12) United States Patent
Turkulainen

(10) Patent No.: US 8,955,132 B2
(45) Date of Patent: Feb. 10, 2015

(54) EMULATION FOR MALWARE DETECTION

(75) Inventor: Jarkko Turkulainen, Klaukkala (FI)

(73) Assignee: F-Secure Corporation, Helsinki (FI)

(*) Notice: Subject to any disclaimer, the term of this patent is extended or adjusted under 35 U.S.C. 154(b) by 685 days.

(21) Appl. No.: 13/066,399

(22) Filed: Apr. 14, 2011

(65) Prior Publication Data

US 2012/0266243 A1    Oct. 18, 2012

(51) Int. Cl.
*G06F 11/00* (2006.01)
*G06F 21/56* (2013.01)
*G06F 9/455* (2006.01)

(52) U.S. Cl.
CPC .............. *G06F 21/566* (2013.01); *G06F 9/455* (2013.01)
USPC .................... 726/24; 726/22; 726/23; 726/25; 713/188

(58) Field of Classification Search
CPC ........ G06F 9/455; G06F 21/566; G06F 21/00
USPC .......................................................... 726/24
See application file for complete search history.

(56) References Cited

U.S. PATENT DOCUMENTS

| 5,398,196 | A  | * | 3/1995  | Chambers ...................... 714/28 |
| 2007/0283125 | A1 | * | 12/2007 | Manczak et al. .............. 711/207 |
| 2008/0126742 | A1 | * | 5/2008  | Shupak et al. ................ 711/217 |
| 2009/0049550 | A1 | * | 2/2009  | Shevchenko .................... 726/23 |
| 2010/0122052 | A1 | * | 5/2010  | Waldspurger et al. ........ 711/162 |
| 2011/0078361 | A1 | * | 3/2011  | Chen et al. ........................ 711/6 |

* cited by examiner

Primary Examiner — Baotran N To
(74) Attorney, Agent, or Firm — Harrington & Smith

(57) ABSTRACT

According to a first aspect of the present invention there is provided a method of performing emulation of at least part of a program using an emulated computer system implemented on a computer system. The method includes, during execution of the program within the emulated computer system, when the program attempts to access a unit of data, copying the unit of data from a memory of the computer system into an emulated memory, and allowing the program to access the unit of data within emulated computer system. A unit of data may be a memory page.

9 Claims, 3 Drawing Sheets

EMULATION FOR MALWARE DETECTION

TECHNICAL FIELD

The present invention relates to emulation for the purpose of detecting malware, or other potentially unwanted programs.

BACKGROUND

Malware is short for malicious software and is used as a term to refer to any software designed to infiltrate or damage a computer system without the owner's informed consent. Malware can include computer viruses, worms, trojan horses, rootkits, adware, spyware and any other malicious and unwanted software.

When a device is infected by a malware program the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware. Furthermore, even if a malware infection does not cause a perceptible change in the performance of a device, it may be performing other malicious functions such as monitoring and stealing potentially valuable commercial, personal and/or financial information, or hijacking a device so that it may be exploited for some illegitimate purpose.

Many end users make use of anti-virus software to detect and possibly remove malware. In order to detect a malware file, the anti-virus software must have some way of identifying it amongst all the other files present on a device. Typically, this requires that the anti-virus software has a database containing the "signatures" or "fingerprints" that are characteristic of individual malware program files. When the supplier of the anti-virus software identifies a new malware threat, the threat is analysed and its signature is generated. The malware is then "known" and its signature can be distributed to end users as updates to their local anti-virus software databases.

Using approaches that rely on signature scanning to detect malware still leaves computers vulnerable to "unknown" malware programs that have not yet been analysed for their signature. To address this issue, in addition to scanning for malware signatures, most anti-virus applications additionally employ heuristic analysis. This approach involves the application of general rules intended to identify patterns that distinguish the behaviour of any malware from that of clean/legitimate programs. For example, the behaviour of all programs on a computer are monitored and if a program attempts to write data to an executable program, the anti-virus software can flag this as suspicious behaviour. Heuristics can be based on behaviours such as API calls, attempts to send data over the Internet, etc.

It can also be useful to perform heuristic analysis of a program whilst it is executed in an isolated environment or test system. The execution of a program in an isolated environment or test system is known as virtualisation or emulation, as the program is executed in a virtual or emulated computer. A virtual machine or emulator comprises a program that mimics the functionality of various components of a real computer system. For example, a computer using a Linux operating system can run a virtual machine that imitates the environment provided by a Windows® operating system. This can include emulation of the CPU, the memory, the communications interfaces and any associated hardware. This enables programs to be executed in the virtual machine/emulator as if it were running on an actual computer system. The program can therefore be analysed without risking damage to the underlying computer system. However, when run within a simulated/emulated computer system or virtual machine, a program may not behave as intended due to the limited resources and/or capabilities of the emulated computer system.

SUMMARY

It is an object of the present invention to overcome or at least mitigate the problem of the limited resources and capabilities that are provided by an emulated computer system, and that can therefore cause a program executed within an emulated computer system to behave other than as it would behave in a real computer system. The present invention therefore ensures that the emulation of the program can be used to accurately predict the behaviour of the program when executed in the real system in order to determine whether the program may be malware, without risking damage to the real computer systems.

According to a first aspect of the present invention there is provided a method of performing emulation of at least part of a program using an emulated computer system implemented on a computer system. The method comprises, during execution of the program within the emulated computer system, when the program attempts to access a unit of data, copying the unit of data from a memory of the computer system into an emulated memory, and allowing the program to access the unit of data within emulated computer system. A unit of data may be a memory page.

The emulated memory may be initially configured to contain no data such that when the program attempts to access a memory page, the emulated computer system establishes a page fault. If so, when the program attempts to access a memory page using an address at which the memory page is located, the emulated computer system can perform address translation to obtain a corresponding address within the emulated memory. The step of copying the unit of data from a memory of the computer system into an emulated memory may then comprise copying the memory page located at the address in the memory of the computer system into the corresponding address within the emulated memory. The step of allowing the program to access the unit of data within the emulated memory may comprise allowing the program to access the corresponding address within the emulated memory.

According to a second aspect of the present invention there is provided a computer program, comprising computer readable code which, when run on a computer, causes the computer to perform the method of the first aspect.

According to a third aspect of the present invention there is provided a computer program product comprising a computer readable medium and a computer program according to the second aspect, wherein the computer program is stored on the computer readable medium.

According to a fourth aspect of the present invention there is provided a method of determining if a program on a computer system is potentially malware. The method comprises performing emulation of at least part of the program in accordance with the method of the first aspect, during the emulation of the program, monitoring the behaviour of the program in order to detect any suspicious behaviour, and, if any suspicious behaviour is detected, determining that the program is potentially malware.

The method may further comprise executing the program in the computer system, interrupting the execution of the program at any point of interest, and continuing execution of the program in the emulated computer system. The step of interrupting the execution of the program at a point of interest can comprise any of using a hook to intercept a call to a function, and stopping the execution when the program reaches a breakpoint. Therefore, prior to executing the program, a hook or breakpoint can be inserted within any functions that may be accessed by malware.

According to a fifth aspect of the present invention there is provided a computer program, comprising computer readable code which, when run on a computer, causes the computer to the method of the fourth aspect.

According to a sixth aspect of the present invention there is provided a computer program product comprising a computer readable medium and a computer program according to the fifth aspect, wherein the computer program is stored on the computer readable medium.

According to a seventh aspect of the present invention there is provided a computer system comprising:

a processor configured to implement an emulated computer system; and a memory configured to provide an actual memory for the computer system and to provide an emulated memory for the emulated computer system;

wherein the processor is further configured such that, when a program being executed in the emulated computer system attempts to access a unit of data, the unit of data is copied from the actual memory into the emulated memory, and the program is allowed to access the unit of data within the emulated memory.

The memory may be further configured such that a unit of data is a memory page. The memory may be further configured such that the emulated memory initially contains no data, and the processor is further configured such that, when the program attempts to access a memory page, the emulated computer system establishes a page fault.

The processor may be further configured such that, when the program attempts to access a memory page using an address at which the memory page is located, address translation is performed to obtain a corresponding address within the emulated memory.

The processor may be further configured such that, when the program attempts to access a memory page using an address at which the memory page is located, a memory page located at the address in the actual memory is copied into the corresponding address within the emulated memory.

The processor may be further configured to allow the program to access the corresponding address within the emulated memory.

The processor may be further configured to monitor the behaviour of the program during emulation in order to detect any suspicious behaviour. To do so, the processor may be further configured to execute the program in the computer system, interrupt the execution of the program at any point of interest, and continue execution of the program in the emulated computer system.

The processor may be further configured to interrupt the execution of the program at a point of interest by any one of using a hook to intercept a call to a function, and stopping the execution when the program reaches a breakpoint. To do so, the processor may be further configured to insert a hook or breakpoint within any functions that may be accessed by malware.

According to an eighth aspect of the present invention there is provided a computer program, comprising computer readable code which, when run on a computer, causes the computer to behave as a computer according to the seventh aspect.

According to a ninth aspect of the present invention there is provided a computer program product comprising a computer readable medium and a computer program according to the eighth aspect, wherein the computer program is stored on the computer readable medium.

DETAILED DESCRIPTION

There will now be described methods and apparatus for determining if a program is malware or is infected with malware in which the program is at least partially executed in an emulated computer system, the emulation of the program making use of data obtained from the real/non-emulated computer system. The behaviour of the program within the emulated system can then be monitored in order to identify any suspicious activity that results from its execution.

This at least partial execution of the program within an emulated system ensures that any malicious actions performed by the program will not affect the actual/non-emulated computer systems. In addition, emulating the execution of the program using data from the actual resources of the computer system overcomes the problem of the limited resources that are available to the emulated computer system, and thereby ensures that the intended behaviour of the program can be accurately predicted.

Figure 1:
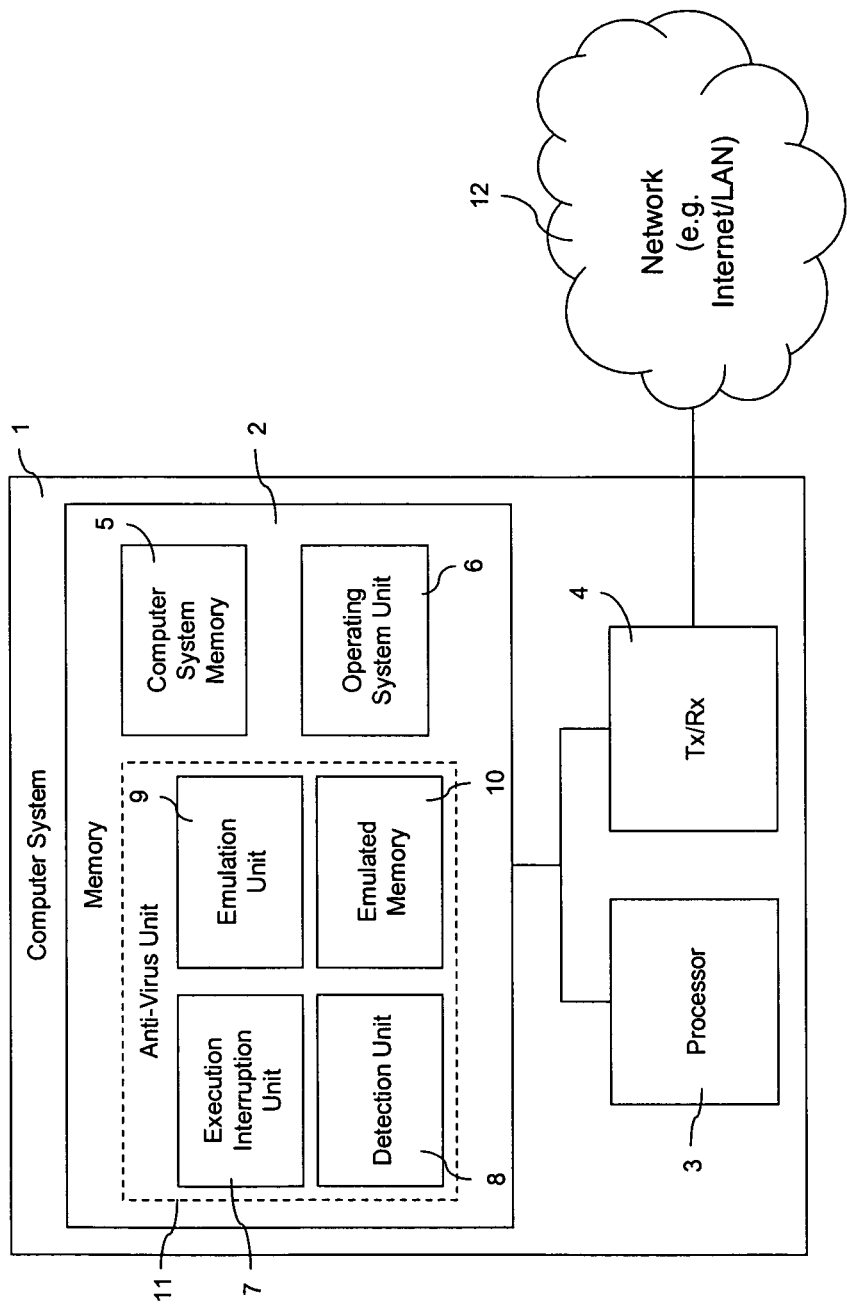
FIG. 1 illustrates schematically a computer system according to an embodiment of the present invention.

FIG. 1 illustrates schematically an example of a computer system 1 suitable for implementing the methods described below. The computer system 1 can be implemented as a combination of computer hardware and software. The computer system 1 comprises a memory 2, a processor 3 and a transceiver 4. The memory 2 stores the various programs/executable files that are implemented by the processor 3, and also provides a computer system memory 5 that stores any data required by the computer system 1. The programs/executable files stored in the memory 2, and implemented by the processor 3, can include an operating system unit 6, an execution interruption unit 7, a detection unit 8, and an emulation unit 9. The memory 2 also provides an emulated memory 10 that is used by the emulation unit 9. The execution interruption unit 7, the detection unit 8, the emulation unit 9 and the emulated memory 10 can be sub-units of an anti-virus unit 11. The transceiver 4 is used to communicate over a network 12 such as a LAN or the Internet. Typically, the computer system 1 may be any of a desktop personal computer (PC), laptop, personal data assistant (PDA) or mobile phone, or any other suitable device.

Figure 2:
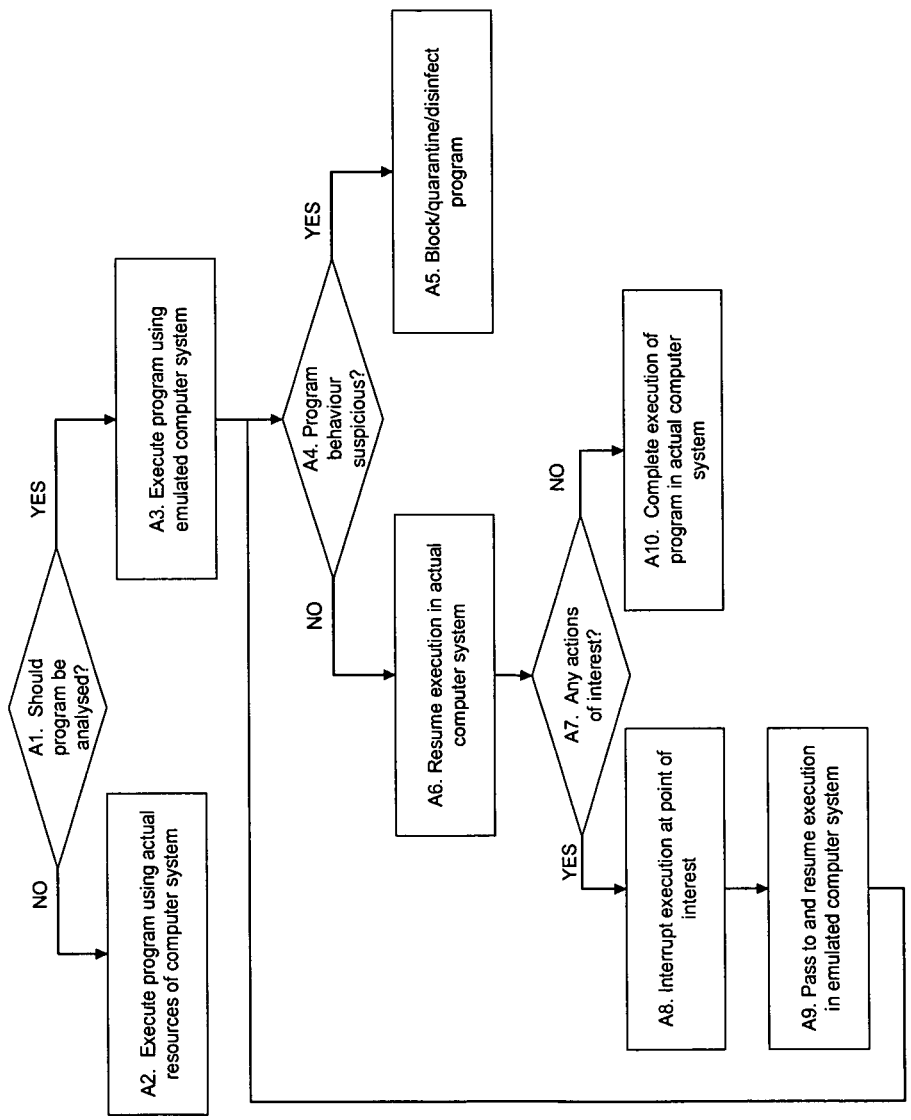
FIG. 2 is a flow diagram illustrating an example of the process of determining if a program is potentially malicious or is infected with malware.

FIG. 2 is a flow diagram illustrating an example of the process of determining if a program is potentially malicious or is infected with malware. The steps are performed as follows:

A1. The anti-virus unit 11 determines if the program should be analysed for potential malware. For example, when execution of a program is initiated, the anti-virus unit 11 could check a "whitelist" stored in the memory 2 to determine if the program is known to be legitimate. This could also involve performing an integrity check to confirm that the program has not been modified since it was added to the whitelist.

A2. If it is determined that the program does not need to be analysed, then the program is executed conventionally, using the actual resources of the computer system 1.

A3. If it is determined that that the program should be analysed, then the computer system 1 begins execution of the program using the emulation unit 9. The emulation unit 9 imitates the environment provided by the actual resources of the computer system 1. This can include emulation of the processor 3, the memory 2, and the operating system unit 6.

A4. During the emulation of the program, the detection unit 9 monitors the behaviour of the program in order to detect any suspicious behaviour that may indicate that the program is, or is infected with, malware.

A5. If suspicious behaviour is detected during the emulation of the program, then the detection unit 8/anti-virus unit 11 will take action to either block, quarantine, or disinfect the program. For example, the anti-virus unit 11 could check if there are any predefined procedures, in the form of a user-definable profile or centrally administered policy, for handling such suspicious programs. If there are some predefined procedures, then the anti-virus unit 11 would take whatever action is required according to these policies. However, if there are no predefined procedures, the anti-virus unit 11 could prompt a user of the computer system 1 to select what action they would like to take regarding the suspected malware.

A6. If no suspicious behaviour is detected during the emulation of the program, then the emulation unit 9 passes control of the program back to the actual resources of the computer system 1, which then resumes/continues with the execution of the program (e.g. from the start of the program or from the point at which execution of the program was interrupted). For example, the actual resources of the computer system 1 include the actual processor 3, memory 2, and operating system unit 6.

A7. The anti-virus unit 11 monitors the execution of the program by the actual resources of the computer system 1 in order to determine if any actions of interest occur. The actions of interest may include any actions that may be relevant to determining whether or not the program is, or is infected with, malware. For example, these actions may include the implementation of any function calls etc that are considered relevant.

A8. If any actions of interest occur during the execution of the program by the actual resources of the computer system 1, then the execution of the program within the computer system 1 is interrupted by the execution interruption unit 7.

A9. Execution of the program is then moved back to the emulation unit 9. In other words, control of the program is passed from the actual resources of the computer system 1 to the emulated computer system implemented by the emulation unit 9. The process then returns to step A4, such that the emulation unit 9 continues with the execution of the program from the point of interruption, the emulation unit 9 imitating the environment provided by the actual resources of the computer system 1.

A10. If no actions of interest occur during the execution of the program by the actual resources of the computer systems 1, then the execution of the program until it is completed. If required, the detection unit 8/anti-virus unit 11 can then add an identifier for the program to the whitelist stored in the memory 2. The detection unit 9/anti-virus unit 11 could also store integrity check information regarding the program in the memory 2.

The execution interruption unit 7 can use various methods to interrupt the execution of the program. For example, during their execution, most programs implement a number of function calls. A function call passes the execution of the program to a particular function/subroutine that performs a particular task. If any of the available function calls are considered to be relevant to the analysis of the program, then the execution interruption unit 7 can insert a hook or jump into these target functions prior to execution of the program, or when execution of the program is initiated, in order to intercept any calls made to those functions. In addition, or as an alternative to hooking, the execution interruption unit 7 can insert debugger breakpoints into any target function in order to interrupt/stop the execution of the program.

In order to move execution of the program to the emulation unit 9, the emulation unit 9 copies the instruction pointer (i.e. the register that points to the next program instruction) of the actual processor 3, to the instruction pointer of the processor simulated by the emulation unit 9. The emulation unit 9 can then resume execution of the program from the point in the execution path at which the execution was interrupted, such that the program is unaware of the interruption.

The emulation of the program by the emulation unit 9 continues until some suspicious behaviour is detected that indicates that the program is, or is infected with, malware, or the resources available for the emulation are exhausted, or the program terminates its execution (e.g. the program calls an 'exit' function).

When the execution of the program by the emulated computer system ends for any reason, control of the program is passed back to the actual resources of the computer system, and the actual computer system resumes execution of the program from the point at which the execution was interrupted by the execution interruption unit 7. By way of example, if a program is in the process of being executed by an actual computer system and the program makes a call to the OpenProcess function, then the execution can be interrupted and control of the program passed to the emulation unit 9. The emulation unit 9 then continues the execution of the program within the emulated computer system. When this emulation of the program ends for any reason, then execution of the program continues within the actual resources of the computer system from the point at which the program made the call to the OpenProcess function. The anti-virus unit 11 functions in this way to ensure that it can examine all of the functionality of the program, as there is no guarantee that the behaviour of the program when executed in the emulated computer system will be identical to the behaviour of the program when executed in the actual computer system, due to the limited functionality and resources of the emulation. In particular, if no suspicious behaviour is detected during the emulation of the program, then the program should be allowed to continue its execution in the actual computer system in order to implement the changes that it intends to make to the actual computer system (e.g. writing of data to the memory).

Figure 3:
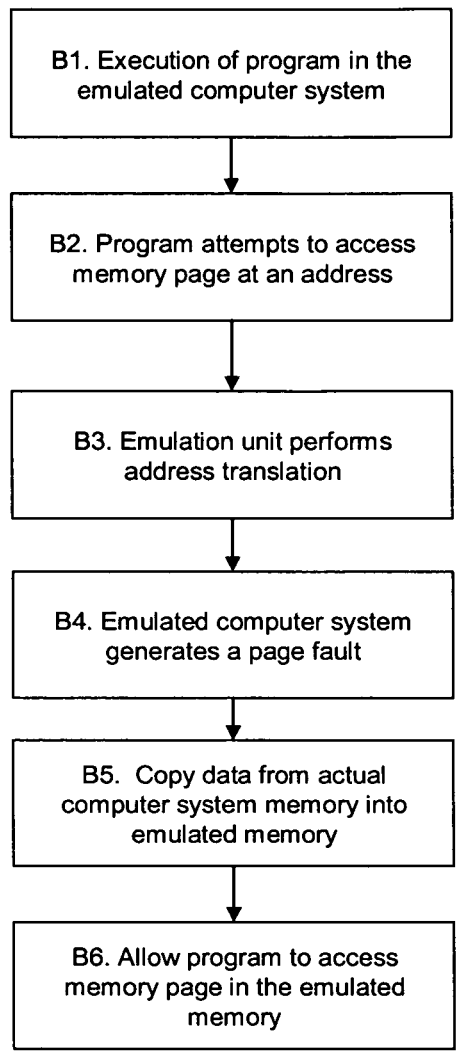
FIG. 3 is a flow diagram illustrating an example of the process of emulating a program.

When emulating the actual resources of the computer system, the emulation unit 9 uses data copied from the actual computer system memory 5 in order to overcome the problem of the limited resources that are available to the emulation unit 9. FIG. 3 is a flow diagram illustrating an example of the process of emulating a program in order to determine if a program may be malware, or may be infected with malware. The steps are performed as follows:

B1. The emulation unit 9 initiates execution of a program within the emulated computer system that it provides.

B2. During its execution, the program attempts to access a memory page (i.e. a fixed-length block in the memory address space), implementing an instruction that specifies an address for this memory page in the memory address space.

B3. The emulated memory 10 performs address translation in order to obtain the corresponding address of a page within the emulated memory 10.

B4. The emulated memory 10 is configured such that it initially contains no data, such that the processor simulated by the emulation unit 9 will establish a page fault whenever the program attempts to access a memory page.

B5. The emulation unit 9 can then load the memory page located at the specified address within actual computer system memory 5 into the corresponding address (i.e. translated address) within the emulated memory 10.

B6. The emulation unit 9 then allows the program to access the memory page within the emulated memory 10.

By way of example, a program may implement an instruction:

CPU.Eip=0x401012

This instruction addresses a particular page in the memory address space of the computer system memory 5. However, the emulated computer system implemented by the emulation unit 9 is provided with an emulated memory 10, which is located in the address space of the emulation unit 9. The emulation unit 9 therefore performs an address translation routine, performing a lookup in order to obtain the address of a page within the emulated memory 10. In this example, the 0x401012 address is translated to 0x1a01012 (e.g. page 0x401000 is translated to 0x1a01000 and an offset (0x12) is added to this base address: 0x1a01000+0x12=0x1a01012) by the emulation unit 9, and the memory at address 0x1a01012 is access by the emulation unit. The emulated program is not aware of this address translation and redirection, and therefore operates as if it has accessed the 0x401012 address. However, as the emulated memory 10 is configured such that it initially contains no data, the attempt to access the memory page located at this address causes the emulation unit 9 to generate a page fault. In order to handle the page fault, the emulation unit 9 stops execution of the program, loads a page with the address 0x401012 from the actual computer system memory 5 into the address space of the emulated memory 10 at the translated address, and then resumes execution of the program. The instruction can therefore be completed using the genuine data copied from the real resources of the computer system.

The detection unit 9 monitors the program within the emulated computer system in order to detect any suspicious behaviour that may indicate that the program is, or is infected with, malware. In most cases, this activity is based on function calls that attempt to make changes to the file system or access the network. However, because the emulation of the program prevents any changes from being made to the real computer system, the emulation unit 8 must be able to handle these function calls and provide a response to the program. In some circumstances, it may be sufficient to simply log the function call and return a faked/mock result to the program. In other circumstances, it may be more appropriate to implement a more complete, operating system-specific response to the function call.

By way of example, when an emulation unit 9 implementing the emulation of an Intel® x86 CPU receives an instruction pointer that addresses the CreateFileA function of the Win32 API, the detection unit 8 could analyse the parameters of the function call to determine if any of the values of these parameters are suspicious. If the detection unit 8 determines that none of these values are suspicious, then the emulation unit 9 could adjust the instruction pointer (i.e. EIP) to the instruction after the call to the CreateFileA function and return a fake handle value via the EAX register. For example:

call CreateFileA mov dword ptr [0x406110], eax; <-set EIP here, return fake handle in EAX cmp dword ptr [0x406110], −1

In this case, the fake handle value could be just a number, such as 0x123, which is written to the emulated EAX register. When the emulation unit 9 later sees a file operation (e.g. ReadFile) with handle 0x123, it knows that this file operation is related to the handle set by the emulation unit 9.

Some non-limiting examples of actions that may be detected by the detection unit 9 and that may be considered suspicious are:

Example 1

The Microsoft Windows® API provides a URLDownloadToFile function that can be used to download bits from the Internet and save them to a file. A program may be considered to be suspicious if the program makes a call to this function in order to download a file and subsequently executes the downloaded file or loads the downloaded file as a module.

Example 2

The Microsoft Windows® API provides a CreateFile function that can be used to create or open a file. A program may be considered to be suspicious if the program makes a call to this function in order to create a file within the system folder and the created file is subsequently started.

Example 3

The Microsoft Windows® API provides an OpenProcess function that can be used to open an existing process object (i.e. an executing program) and returns an open handle to the specified process. A program may be considered to be suspicious if the program makes a call to this function in order to open a handle to the process and executable content is written to the process address space.

It will be appreciated by the person of skill in the art that various modifications may be made to the above described embodiments without departing from the scope of the present invention. For example, whilst the above-described embodiments refer to a program that is to be analysed as being initially executed using the actual resources of the computer system, with emulation of the program only being implemented once a point of interest has been reached, the entirety of a program that is to be analysed could be executed in the emulated environment.

The invention claimed is:

1. A method of determining if a program is potentially malware, comprising:

executing said program on a real computer system including accessing data stored in a computer system memory;

interrupting the execution of the program at a point of interest;

in response to interrupting the execution of the program at the point of interest, performing an emulation of at least part of the program using an emulated computer system implemented on the real computer system;

during execution of the program within the emulated computer system, when the program attempts to access a unit of data stored in said computer system memory, copying the unit of data from the computer system memory into an emulated memory, and allowing the program to access the unit of data within the emulated computer system, and furthermore during the emulation of the program, monitoring the behavior of the program in order to detect any suspicious behavior; and if any suspicious behavior is detected, determining that the program is potentially malware.

2. The method as claimed in claim 1, wherein the unit of data is a memory page.

3. The method as claimed in claim 2, wherein the emulated memory is initially configured to contain no data such that when the program attempts to access the memory page, the emulated computer system establishes a page fault.

4. The method as claimed in claim 2, wherein, when the program attempts to access the memory page using an address at which the memory page is located, the emulated computer system performs address translation to obtain a corresponding address within the emulated memory.

5. The method as claimed in claim 4, wherein the step of copying the unit of data from the computer system memory into the emulated memory comprises: copying the memory page located at the address in the computer system memory into the corresponding address within the emulated memory.

6. The method as claimed in claim 5, wherein the step of allowing the program to access the unit of data within the emulated memory comprises: allowing the program to access the corresponding address within the emulated memory.

7. The method as claimed in claim 1, wherein the step of interrupting the execution of the program at a point of interest comprises any of: using a hook to intercept a call to a function; and stopping the execution when the program reaches a breakpoint.

8. The method as claimed in claim 7, and further comprising: prior to executing the program, inserting the hook or breakpoint within any functions that are accessed by malware.

9. A non-transitory computer readable storage medium comprising computer program instructions for determining whether a program is malware and, when run on a computer, causes the computer to perform interruption of said program executing on a real computer system at a point of interest, where the execution includes accessing data stored in a computer system memory;

in response to interruption of said program executing on a real computer system at the point of interest, emulation of at least part of the program using an emulated computer system implemented on said real computer system, the emulation comprising:

during execution of the program within the emulated computer system, when the program attempts to access a unit of data, copying the unit of data from the computer system memory into an emulated memory, and allowing the program to access the unit of data within the emulated computer system, and during the emulation of the program, monitoring the behavior of the program in order to detect any suspicious behavior; and if any suspicious behavior is detected, determining that the program is potentially malware.

\* \* \* \* \*